US007738690B2

(12) United States Patent
Liu et al.

(10) Patent No.: US 7,738,690 B2
(45) **Date of Patent: *Jun. 15, 2010**

(54) VERIFICATION METHOD FOR DETERMINING AREAS WITHIN AN IMAGE CORRESPONDING TO MONETARY BANKNOTES

(75) Inventors: Xu-Hua Liu, Los Angeles, CA (US); Byung-Tae Oh, Los Angeles, CA (US); Young-Min Kwak, Gardena, CA (US); Chung-Chieh Kuo, Taipei (TW); Tzu-Hung Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 938 days.

This patent is subject to a terminal disclaimer.

(21) Appl. No.: 11/533,759

(22) Filed: Sep. 20, 2006

(65) Prior Publication Data

US 2008/0069426 A1 Mar. 20, 2008

(51) Int. Cl.
*G06K 9/00* (2006.01)

(52) U.S. Cl. ...................................................... 382/135

(58) Field of Classification Search ................. 382/100, 382/135–138, 173, 176, 165, 190; 364/724.12; 358/2.1, 3.24
See application file for complete search history.

(56) References Cited

U.S. PATENT DOCUMENTS 5,533,144 A 7/1996 Fan
5,638,496 A 6/1997 Sato
6,026,186 A 2/2000 Fan
6,067,374 A 5/2000 Fan et al.
6,181,813 B1 1/2001 Fan et al.
6,256,412 B1 7/2001 Miyazawa et al.
6,317,524 B1 11/2001 Wu et al.
6,343,204 B1 1/2002 Yang
6,473,202 B1 * 10/2002 Kanata et al. ................ 358/2.1
6,515,764 B1 2/2003 Knox et al.
6,516,078 B1 2/2003 Yang et al.
6,542,629 B1 4/2003 Wu et al.
6,574,366 B1 6/2003 Fan
6,580,820 B1 * 6/2003 Fan ............................ 382/135
6,731,784 B2 5/2004 Yang
RE38,716 E * 3/2005 Caspi et al. ................. 382/141
2002/0146167 A1 10/2002 Imamura
2004/0247169 A1 12/2004 Ross
2005/0100204 A1 * 5/2005 Afzal et al. ................. 382/135

* cited by examiner

*Primary Examiner*—Vu Le
*Assistant Examiner*—Claire Wang
(74) *Attorney, Agent, or Firm*—Winston Hsu

(57) ABSTRACT

Verification of areas within an image corresponding to banknotes includes dividing the image into a plurality of image sections; generating a banknote boundary map having border sections corresponding to a boundary of monetary banknotes within the image; generating a texture decision map having texture sections within a valid range according to a valid monetary banknote; determining a number of objects in the texture decision map by removing texture sections in the texture decision map that correspond to the border sections in the banknote boundary map; calculating a texture property value for each object; calculating a shape property value for each object; and further removing texture sections from the texture decision map corresponding to objects that do not have the texture property value within a first predetermined range and the shape property value within a second predetermined range.

21 Claims, 11 Drawing Sheets

VERIFICATION METHOD FOR DETERMINING AREAS WITHIN AN IMAGE CORRESPONDING TO MONETARY BANKNOTES

BACKGROUND OF THE INVENTION

1. Field of the Invention

The present invention relates to image processing, and more particularly, to a verification method for determining areas within an image corresponding to monetary banknotes.

2. Description of the Prior Art

Improvements in image duplication systems, which can include digital color copiers, scanners, and small scale printing apparatuses, has also lead to an increase in the illegal reproduction of various items. Counterfeiters nowadays attempt the reproduction of monetary banknotes, currencies, stocks, bonds, and other items for personal gain and profit. The task of discerning between legitimate items and copies becomes increasingly more difficult as printing and reproduction improvements allow copiers to reproduce banknotes that are virtually identical to legitimate ones. Therefore, there is a need to be able to effectively and precisely discern and distinguish counterfeited banknotes from authentic ones.

Banknote detection systems today typically incorporate a scanner or scanning mechanism of sorts. This converts information from a sample banknote into a digital data format representation for image processing. Once converted into digital data, a series of tests and procedures can be performed in order to confirm the validity of the sample banknote. This may include the identification of key features, such as landmarks, holograms, colors, serial numbers and pigments.

An important aspect of counterfeit currency detection prior to identification of key features involves the verification of areas corresponding to the monetary banknote within the scanned image. Often times, the size of the image is greater than that of the banknote. The actual location of banknotes within the image is thus required so that relevant counterfeiting tests can be performed on the confirmed areas, and not on the background image. Additionally, knowing the areas corresponding to the banknote will allow determination of a coordinate system for referencing in further tests.

If the banknote is scanned while imposed on a complicated background, the difficulty associated with distinguishing the actual banknote location increases. Background noise and patterns may further complicate the detection process. This may introduce irregularities, and invalid background objects can be misinterpreted as a banknote location. Variations in the shift, rotation and alignment of banknotes within the image may also complicate identification processes as a set frame of reference cannot be initially implemented.

Without the proper verification of banknote locations within a scanned image, being separated from the background image, optimal conditions for accurate counterfeit currency detection cannot be met.

SUMMARY OF THE INVENTION

One objective of the claimed invention is therefore to provide a verification method for determining areas within an image corresponding to monetary banknotes, to solve the above-mentioned problem.

According to an exemplary embodiment of the claimed invention, a verification method for determining areas within an image corresponding to monetary banknotes is disclosed. The method comprises: dividing the image into a plurality of image sections; generating a banknote boundary map having border sections selected from the image sections, the border sections corresponding to a boundary of monetary banknotes within the image; generating a texture decision map having texture sections selected from the image sections, the texture sections having a texture value within a valid range according to a valid monetary banknote; determining a number of objects in the texture decision map by removing texture sections in the texture decision map that correspond to the border sections in the banknote boundary map; calculating a texture property value for each object according to a texture feature map having a texture feature value for each image section; calculating a shape property value for each object; and further removing texture sections from the texture decision map corresponding to objects that do not have the texture property value within a first predetermined range and the shape property value within a second predetermined range.

These and other objectives of the present invention will no doubt become obvious to those of ordinary skill in the art after reading the following detailed description of the preferred embodiment that is illustrated in the various figures and drawings.

DETAILED DESCRIPTION

The present invention described herein provides a verification method for determining areas within an image corresponding to monetary banknotes. The image is provided from a hardware scanner or similar device, where the image contains a sample monetary banknote of a particular currency type. Characteristics derived from the sample monetary banknote is compared with that of known values and/or ranges of valid monetary banknotes in verification of its location within the image. The types of currencies can include, but are not limited to United States of America currency and Japanese denomination currencies.

The method can be applied for use in the detection of counterfeit currency. The scanned image can provide the sample monetary banknote with an arbitrary rotational axis and shift alignment within the image. Additionally, the scanned image can contain the sample monetary banknote while superimposed onto any arbitrary background, can contain multiple isolated or independent banknotes, or have overlapping banknotes. The method can be used in conjunction with basic stand-alone scanners, copiers, stand-alone printers, and other related detection and scanning hardware.

The verification method described in this present invention makes use of new innovations not introduced by the prior art. This not only provides an increased means of security measures when used in application for counterfeit banknote detection, it also provides ease of integration with common hardware devices and a viable low cost approach. Accurate detection rates, and low false alarm rates can therefore be attained. It is also robust and flexible enough to be applied to different image types and conditions.

Prior to a concise description of the present invention color processing method, it is important to understand that certain terms used throughout the following description and claims will refer to particular processes or steps. As one skilled in the art will appreciate, designers may refer to such processes by different names. This document does not intend to distinguish between items that differ in name but not function. In the following discussion and in the claims, the terms "including" and "comprising" are used in an open-ended fashion, and thus should be interpreted to mean "including, but not limited to . . . ".

Figure 1:
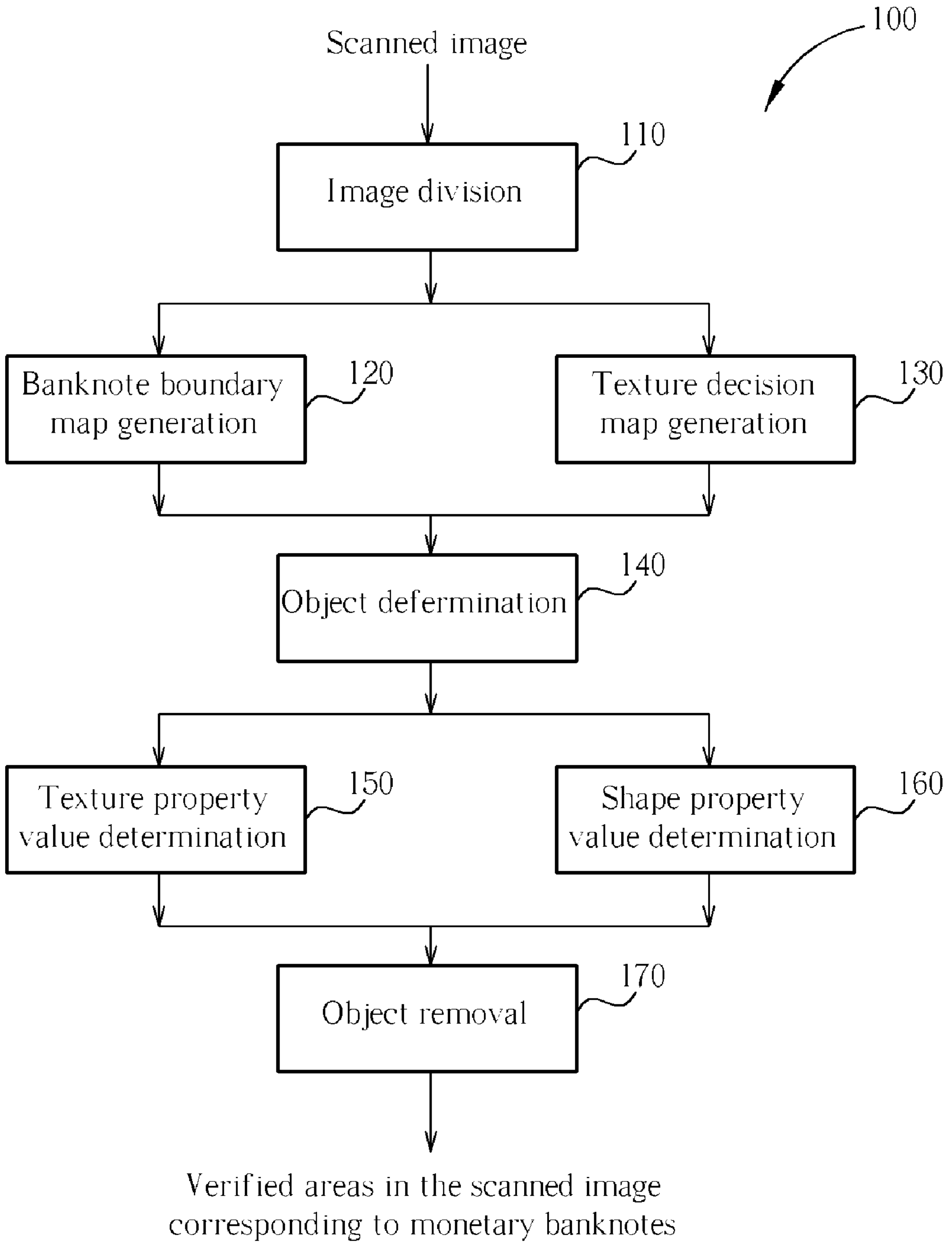
FIG. 1 illustrates an overview of the verification method for determining areas within an image corresponding to monetary banknotes according to an exemplary embodiment of the present invention.

An overview of a verification method for determining areas within an image corresponding to monetary banknotes according to the present invention is illustrated with reference to FIG. 1. The method 100 first comprises receiving a scanned image, possibly containing a sample monetary banknote. Upon receiving the scanned image, image division 110 is performed to separate the image into multiple image sections. Banknote boundary map generation 120 is subsequently performed to create a banknote boundary map having border sections chosen from the image sections. The border sections correspond to a boundary of monetary banknotes within the image. At the same time, texture decision map generation 130 operates to create a texture decision map having texture sections chosen from the image sections. The texture sections are image sections possessing a texture value within a valid range according to a valid monetary banknote.

Object determination 140 manages to isolate and count objects in the texture decision map. An object ideally corresponds to a monetary banknote, but may include other identified items in the texture decision map. Each object is separated from each other by removing texture sections in the texture decision map that correspond to the border sections in the banknote boundary map.

Following object determination 140 are texture property determination 150, and shape property determination 160, each performed on identified objects in the prior step. Texture property determination 150 calculates a texture property value for each object according to a texture feature map having a texture feature value for each image section. Shape property determination 160 calculates a shape property value for each object.

Finally, based on the results of texture property determination 150 and shape property determination 160, object removal 170 operates in further removing texture sections from the texture decision map corresponding to objects that do not have the texture property value within a first predetermined range and the shape property value within a second predetermined range. The resulting texture decision map displays verified areas corresponding to monetary banknotes in the scanned image.

A detailed description for each of the above identified process steps in FIG. 1 will be discussed below, including relevant figures and diagrams for each section.

Image Division

Figure 2:
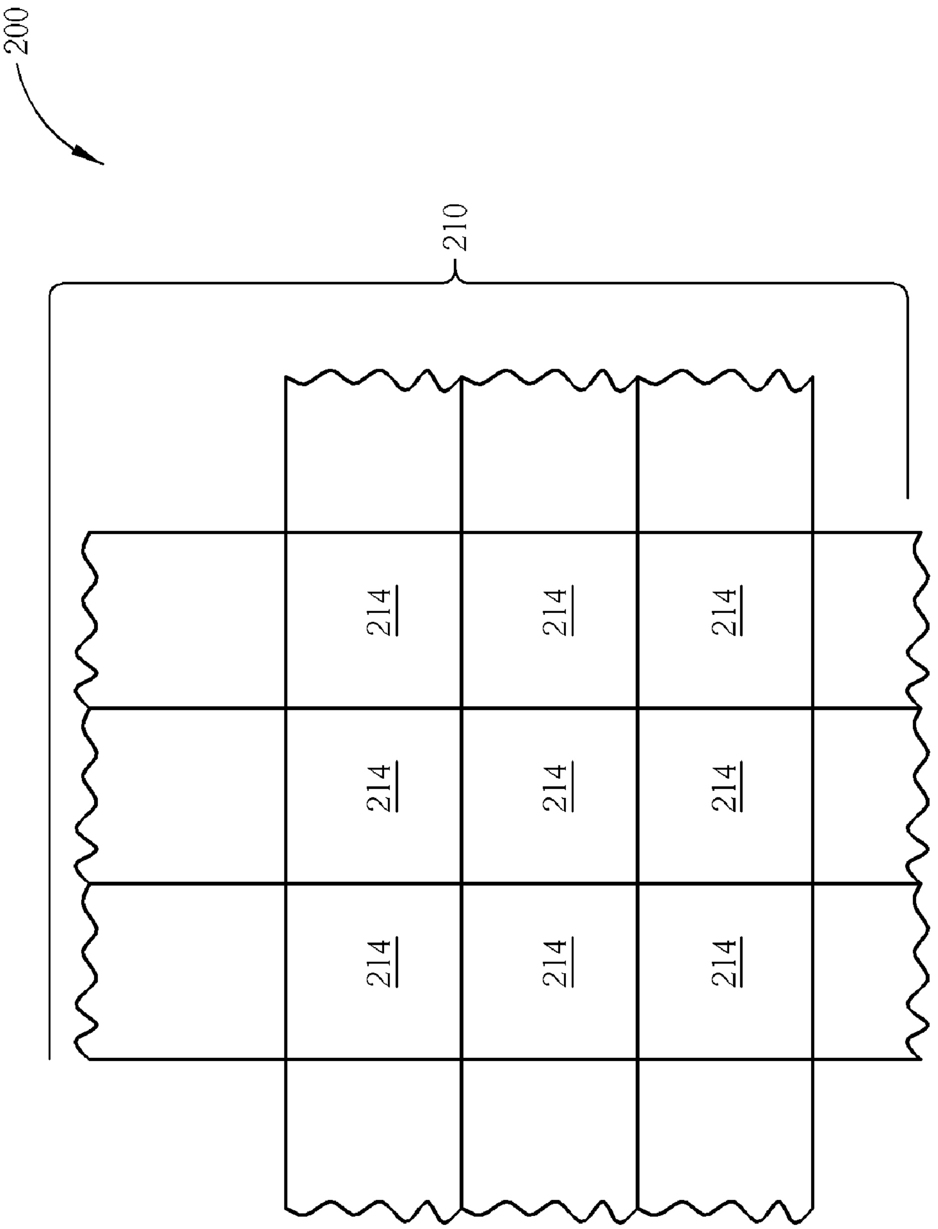
FIG. 2 illustrates an exemplary embodiment of a scanned image divided into a plurality of image sections according to the method of FIG. 1.
Figure 3:
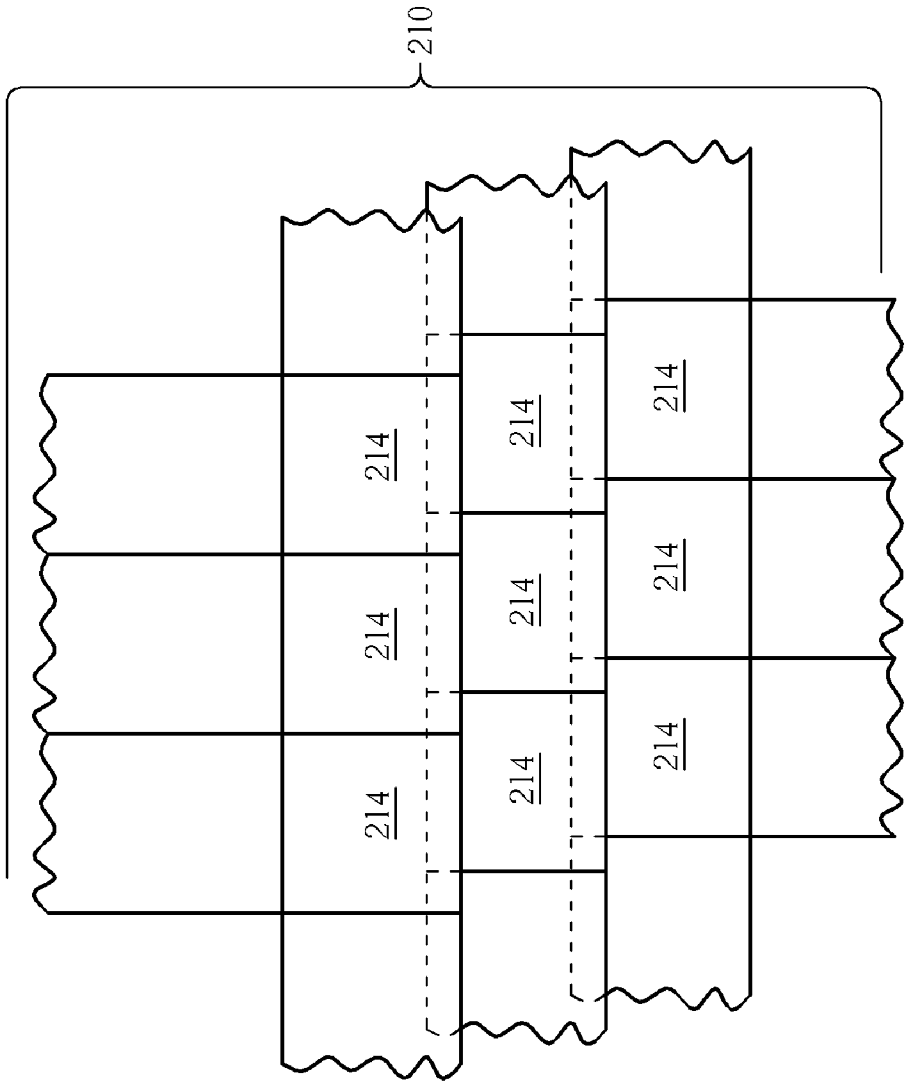
FIG. 3. illustrates the plurality of image sections in an overlapping manner according to another exemplary embodiment of the method of FIG. 1.

The goal of image division 110 is to divide a scanned image into multiple image sections for computational efficiency. Each image section can then be processed individually, as opposed to an entire image, to provide for a greater resolution in related calculations and processes. The size and shape of the image sections can vary according to various embodiments of the present invention, and the examples provided below are in no way meant to be limiting. FIG. 2 illustrates an exemplary embodiment of a scanned image divided into a plurality of image sections 210. The plurality of image sections 210 comprises several individual image sections 214. Although FIG. 2 illustrates the image divided into a fitted manner, other embodiments may employ an overlapping distribution, such as shown in FIG. 3. This exemplary embodiment illustrates where the plurality of image sections are overlapping, to provide an even greater resolution for following calculations and procedural steps.

Banknote Boundary Map Generation

Figure 4:
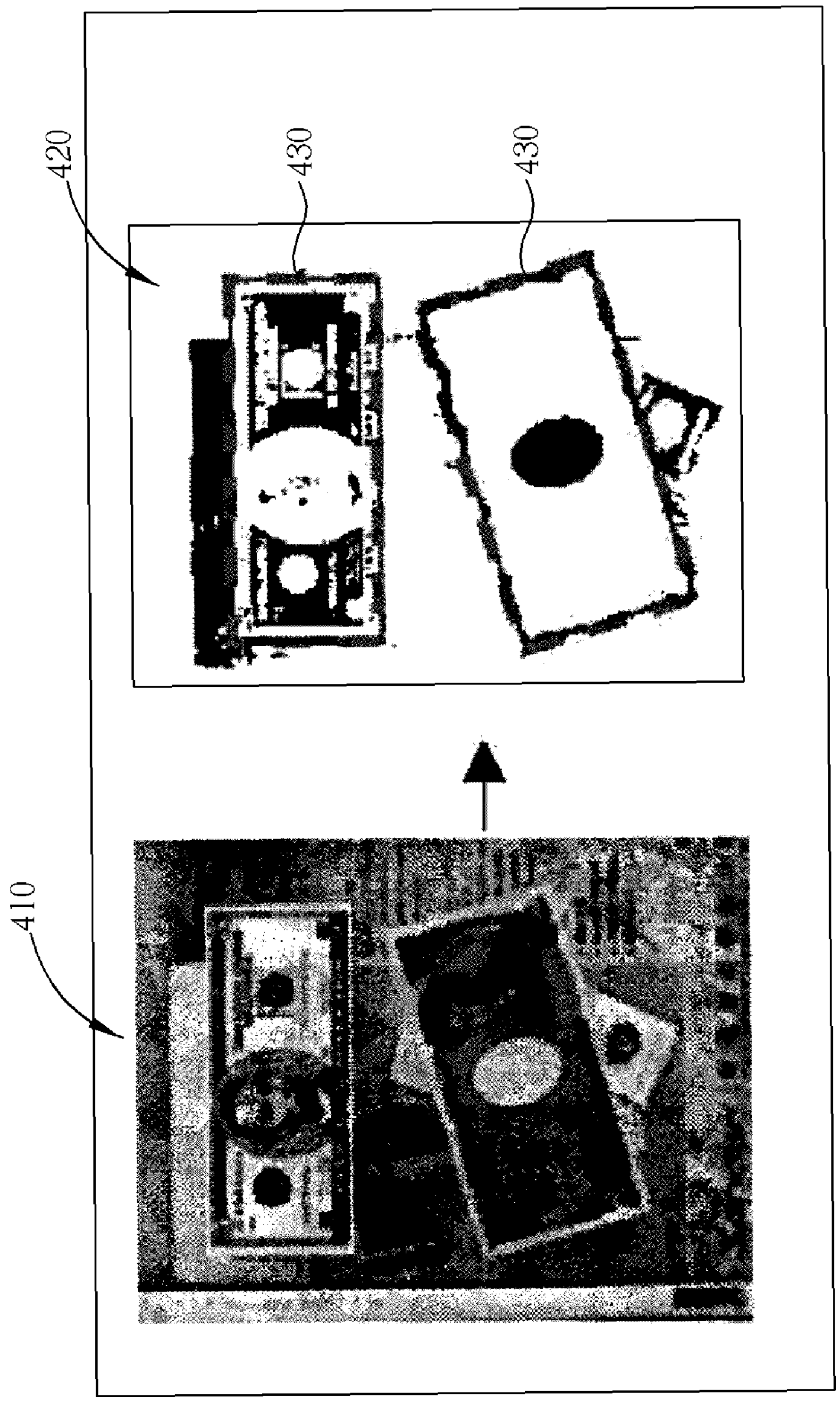
FIG. 4 illustrates creation of a banknote boundary map according to the method of FIG. 1.

Banknote boundary map generation 120 focuses on the creation of a banknote boundary map. FIG. 4 illustrates this step. The banknote boundary map 420 is derived from a scanned image 410 containing monetary banknotes. Border sections 430, which correspond to a boundary of monetary banknotes within the scanned image 410, are selected and identified. Thus the banknote boundary map 420 highlights the perimeter boundary areas of monetary banknotes if they are included in an original image scan.

The exact implementation for discerning the border sections 430 from the original scanned image 410 can vary according to a number of embodiments. One embodiment involves comparing color histogram data of image sections 214 of the scanned image 410 to color histogram data corresponding to boundaries of valid monetary banknotes. Another embodiment involves comparing texture data of the image sections 214 to texture data corresponding to boundaries of valid monetary banknotes. The exact implementation of the banknote boundary map is intermediate, as long as the banknote boundary map suffices in identifying border sections from the image sections corresponding to a boundary of monetary banknotes within the scanned image.

Texture Decision Map Generation

Texture decision map generation 130 produces a binary texture decision map based on the scanned image. Texture values for each image section of the scanned image are first calculated, and then compared to texture values of a valid monetary banknote. Texture sections are then selected from the image sections having texture values within a valid range of a valid monetary banknote.

Figure 5:
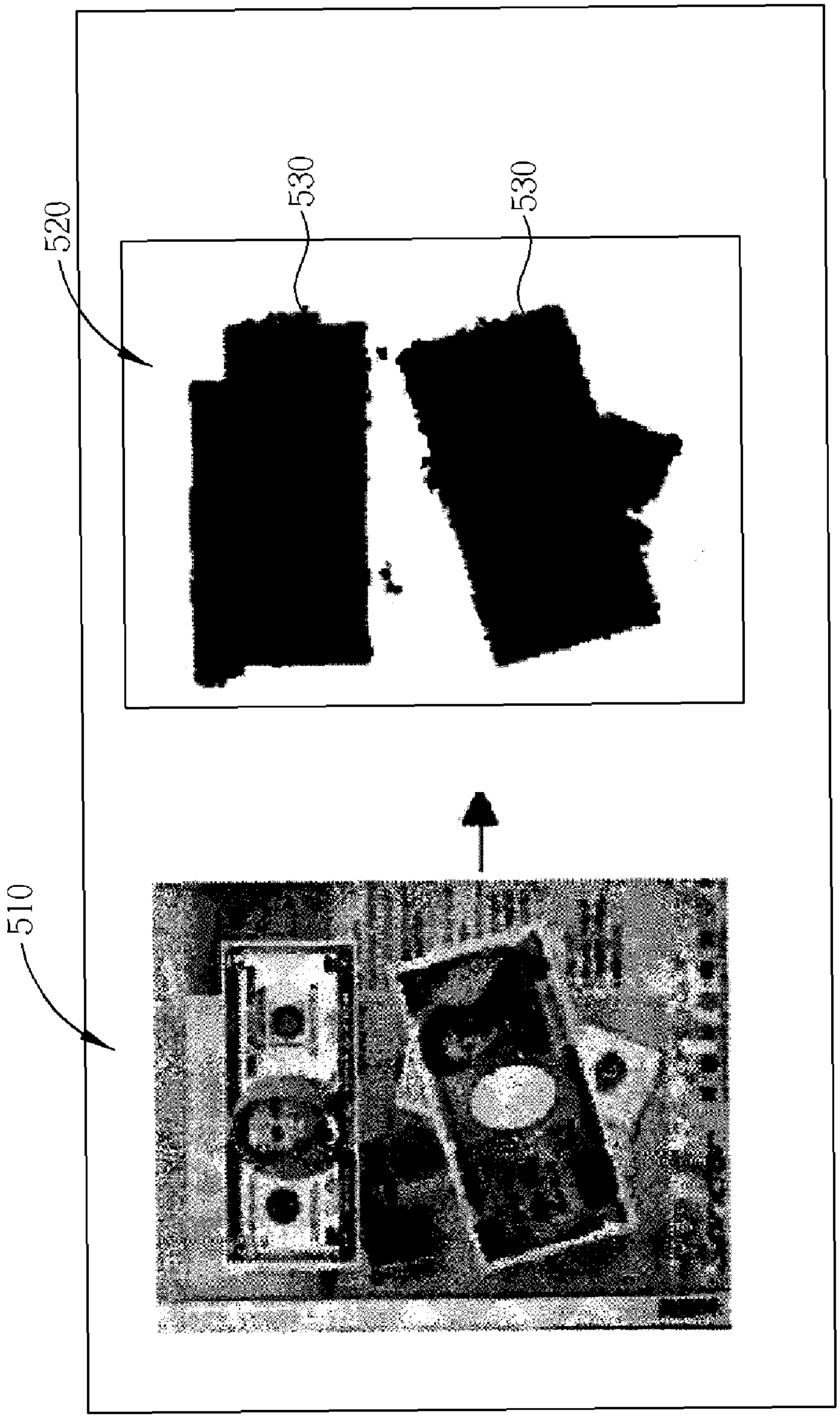
FIG. 5 illustrates generation of a texture decision map according to the method of FIG. 1.

FIG. 5 illustrates generation of the texture decision map 520 from a scanned image 510. Upon performing the above described process, texture sections 530 are identified accordingly from the image sections of the scanned image 510.

The texture values utilized in discerning the texture sections 530 can vary according to a number of embodiments. One embodiment involves utilizing gray levels as the texture value, and comparing gray levels of image sections to gray levels of a valid monetary banknote to determine the texture sections. Other embodiments may use different texture values, such as contrast levels, halftone levels, and edge frequencies. The exact type of texture value utilized is in fact intermediate, as long as the texture decision map 520 suffices in identifying texture sections 530 from the image sections having texture values within a valid range according to a valid monetary banknote.

Object Determination

Having both a banknote boundary map 420 and texture decision map 520 in place, object determination can be resolved. The goal of object determination is to distinguish a number of objects within the scanned image, any of which can potentially be a monetary banknote. In order to accomplish this, overlapping regions in the texture decision map must have individual objects separated from each other. This is accomplished by removing texture sections in the texture decision map that correspond to the border sections in the banknote boundary map. Because the border sections in the banknote boundary map outline the banknotes, it can be used to separate individual banknote regions in the texture decision map.

Figure 6:
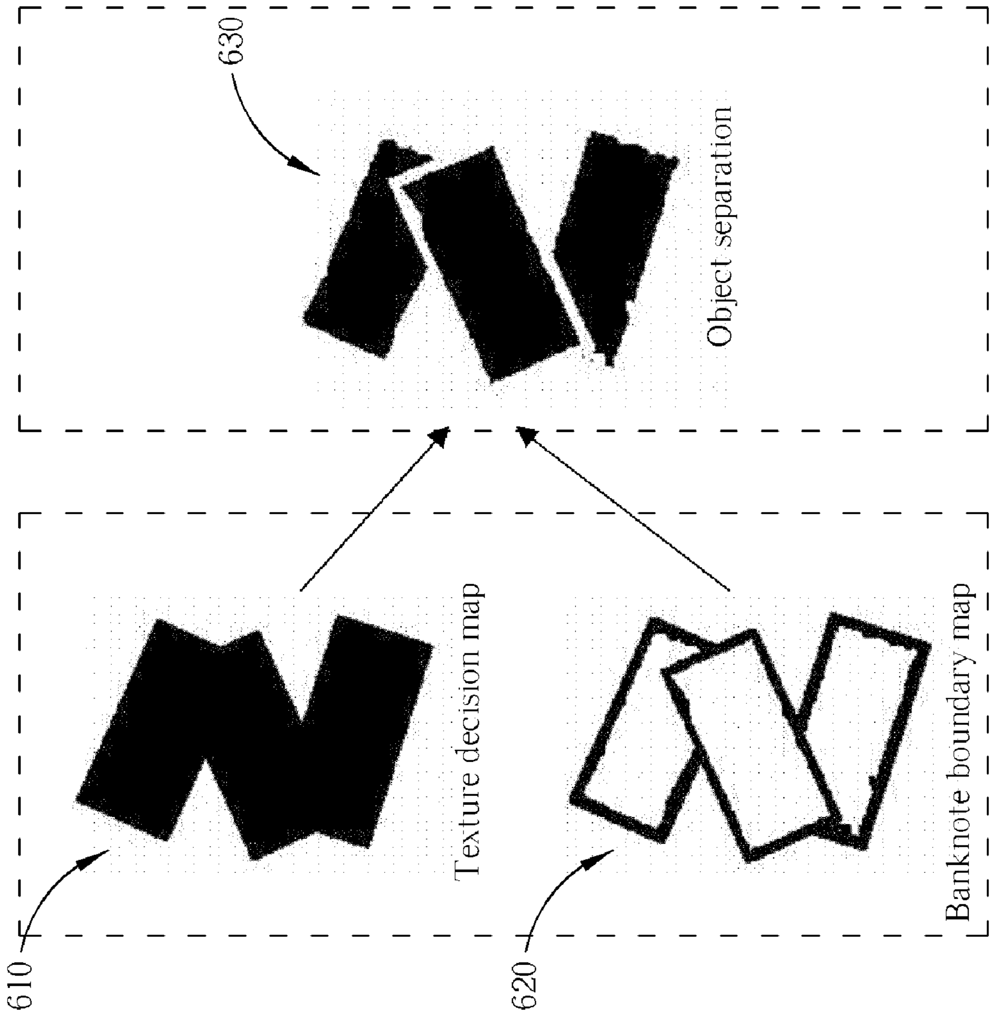
FIG. 6 illustrates the object determination step according to the method of FIG. 1.
Figure 7:
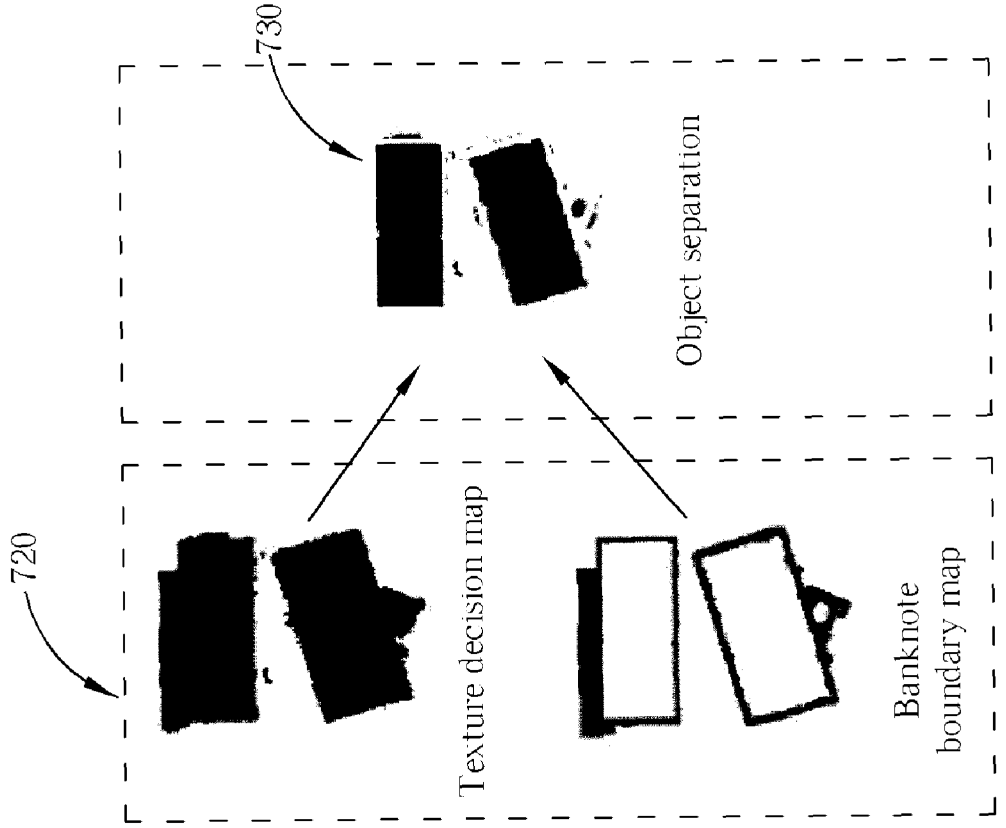
FIG. 7 additionally illustrates the object determination step according to the method of FIG. 1.

FIGS. 6 and 7 illustrate the object determination 140 step. In FIG. 6 a texture decision map 610 is shown having texture sections of three overlapping banknotes. The banknote boundary map 620 contains the border sections outlining the three banknotes. When the texture sections corresponding to the border sections are removed, the three banknotes are then separated in object separation 630. FIG. 7 illustrates a similar example, but with the texture decision map 710 containing two banknote regions having surrounding background noise. In this case, as the texture sections for the two banknote areas are already separated, object determination 140 manages to remove the redundant noise to more properly define the banknote regions. Texture sections in the texture decision map 710 that correspond to border sections in the banknote boundary map 720 are removed, with the results shown in object separation 730. True banknote areas and residual objects remain, all of which will be verified in the following step for correspondence with valid monetary banknotes.

Texture Property Value Determination

Having identified and isolated a number of objects in object determination 140, texture property value determination 150 focuses on calculation of a texture property value for each of the individual objects. This texture property value will then be compared to known values corresponding to valid monetary banknotes to verify whether the texture of the relevant object agrees with the valid monetary banknote.

The exact calculation for the texture property value can vary according to the different embodiments of the present invention. For example, in one embodiment, it is calculated according to a texture feature map, which possesses a texture feature value for each image section of the scanned image. The texture feature map therefore already contains texture characteristics of the scanned image. Texture feature values for the image sections that correspond to the object in question are used in calculation of the texture property value of the object.

In one embodiment, the texture feature map is a gray level feature map having gray levels as the texture feature value for each section. In other embodiments, the texture feature map is a contrast feature map having contrast values as the texture feature value for each section, or even halftone feature map having halftone values as the texture feature value for each section. The exact type or format of the texture feature map and corresponding texture feature value for image sections is intermediate, as long as the texture feature map suffices in characterizing image sections of the scanned image in terms of texture. The principles taught in the present invention are equally applicable for any type of texture map which may be implemented.

With a texture feature map selected, the texture property value can then be determined. One preferred embodiment jointly utilizes a mean value and a variance value of the texture feature values for image sections corresponding to the object in calculation of the texture property value. However, other embodiments may singularly use a mean value, or just a variance value in calculation of the texture property value. Again, the exact calculation or formulae pertaining to the texture property value can vary, and is intermediate, as long as an appropriate texture feature map is utilized that characterizes image sections of the scanned image in terms of texture. The principles taught in the present invention are equally applicable regardless of the precise calculation and implementation of the texture property value.

In order to provide a further degree of resolution in calculating the texture property value, an additional embodiment of the present invention utilizes a second texture feature map having a second texture feature value for each image section in the texture property value calculation. The use of two texture feature maps reduces variability in the calculation, as now it utilizes two distinct texture feature aspects relating to the scanned image. Also, a greater accuracy in verification of texture sections corresponding to valid monetary currency is assumed.

Similar to the first texture feature map, the second texture feature map can be a gray level feature map having gray levels as the second texture feature value for each section, a contrast feature map having contrast values as the second texture feature value for each section, or a halftone feature map having halftone values as the second texture feature value for each section. Again, the exact type or format of the second texture feature map and corresponding second texture feature value is intermediate, as the teachings of the present invention are equally applicable for any type of second texture map implemented.

Shape Property Value Determination

Shape property value determination 160 focuses on calculating a shape property value for each of the identified objects. The shape property value will then be compared to known values corresponding to valid monetary banknotes to verify whether the shape of the relevant object agrees with that of the valid monetary banknote.

The specific formulae for calculating the shape property value can vary according to a number of embodiments. In one embodiment, the shape property value for each object simply comprises determining an area of the object. This may include utilizing four corners of the object to determine the area of the object. Other embodiments can additionally include: determining a distance between center points of two different diagonal lines within the object, determining lengths of two parallel lines within the object, determining an inner product using four angles within the object, and determining a ratio of a width of the object and a height of the object.

Although the exact calculation of the shape property value can vary according to different embodiments, its exact representation is intermediate, as the teachings of the present invention are equally applicable for any calculation for shape property value implemented.

Object Removal

With texture property values and shape property values determined for each object, the object removal 170 focuses on removing objects that do not correspond to a valid monetary banknote. This is accomplished by further removing texture sections from the texture decision map corresponding to objects, which do not have a texture property value within a first predetermined range, and a shape property value within a second predetermined range.

In the preferred embodiment of the invention, the first predetermined range corresponds to valid texture property values of valid monetary banknotes. The second predetermined range corresponds to valid shape property values of valid monetary banknotes. Therefore, should an identified object have both a texture property value and shape property value within the above valid ranges (both corresponding to a valid monetary banknote), its corresponding texture sections are left in the texture decision map to verify a location of valid monetary banknote within the scanned image. Otherwise, if either the texture property value or shape property value of the object are not within the above respective ranges, their corresponding texture sections are removed from the texture decision map.

Figure 8:
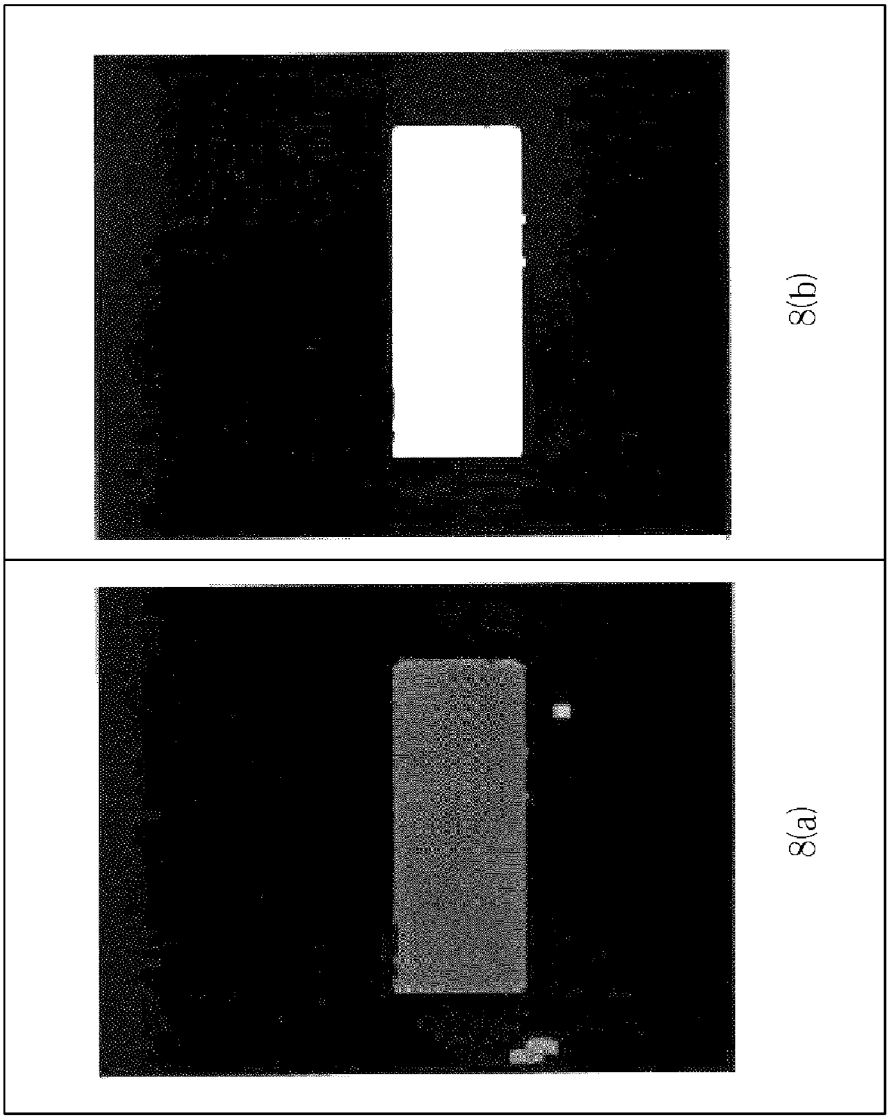
FIG. 8 illustrates an example of object removal according to an embodiment of the present invention.

FIG. 8 illustrates an example of object removal 170 according to the present invention. 8(*a*) illustrates a texture decision map with three identified objects. Although texture property values are calculated for all three objects, it is evident that the smaller objects on the left, and below, clearly do not correspond with that of a valid monetary banknote. In 8(*b*), the smaller objects described above are removed upon Object removal 170, as they do not have shape property values within the second predetermined range.

Figure 9:
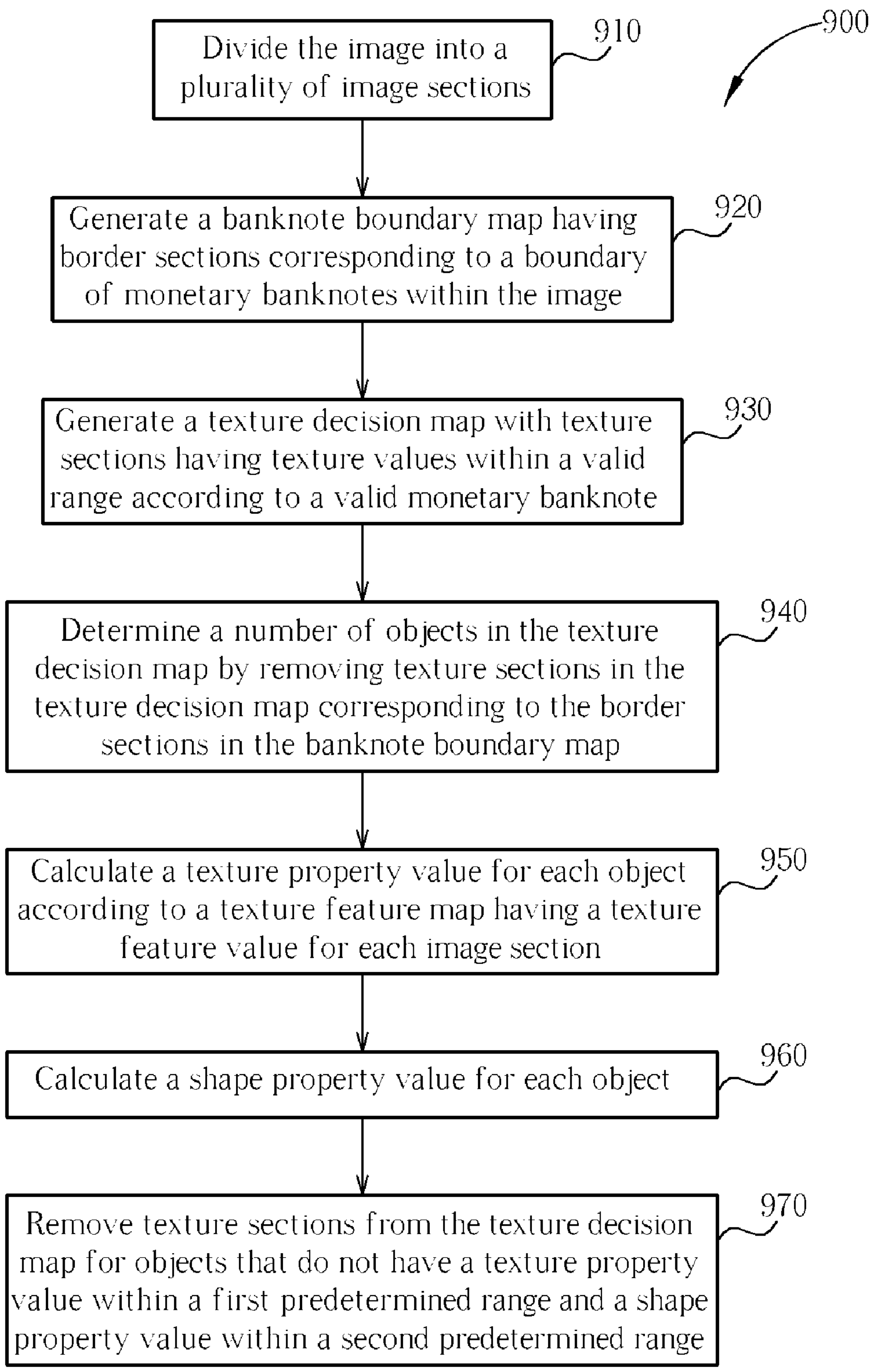
FIG. 9 illustrates a process flow chart of the verification method for determining areas within an image corresponding to monetary banknotes according to an embodiment of the present invention.

A process flow chart for the verification method for determining areas within an image corresponding to monetary banknotes is presented in FIG. 9. Provided that substantially the same result is achieved, the steps of process 900 need not be in the exact order shown and need not be contiguous, that is, other steps can be intermediate. The method comprises:

Step 910: Divide the image into a plurality of image sections.

Step 920: Generate a banknote boundary map having border sections selected from the image sections, the border sections corresponding to a boundary of monetary banknotes within the image.

Step 930: Generate a texture decision map having texture sections selected from the image sections, the texture sections having a texture value within a valid range according to a valid monetary banknote.

Step 940: Determine a number of objects in the texture decision map by removing texture sections in the texture decision map that correspond to the border sections in the banknote boundary map.

Step 950: Calculate a texture property value for each object according to a texture feature map having a texture feature value for each image section.

Step 960: Calculate a shape property value for each object.

Step 970: Remove texture sections from the texture decision map corresponding to objects that do not have the texture property value within a first predetermined range and the shape property value within a second predetermined range.

Figure 10:
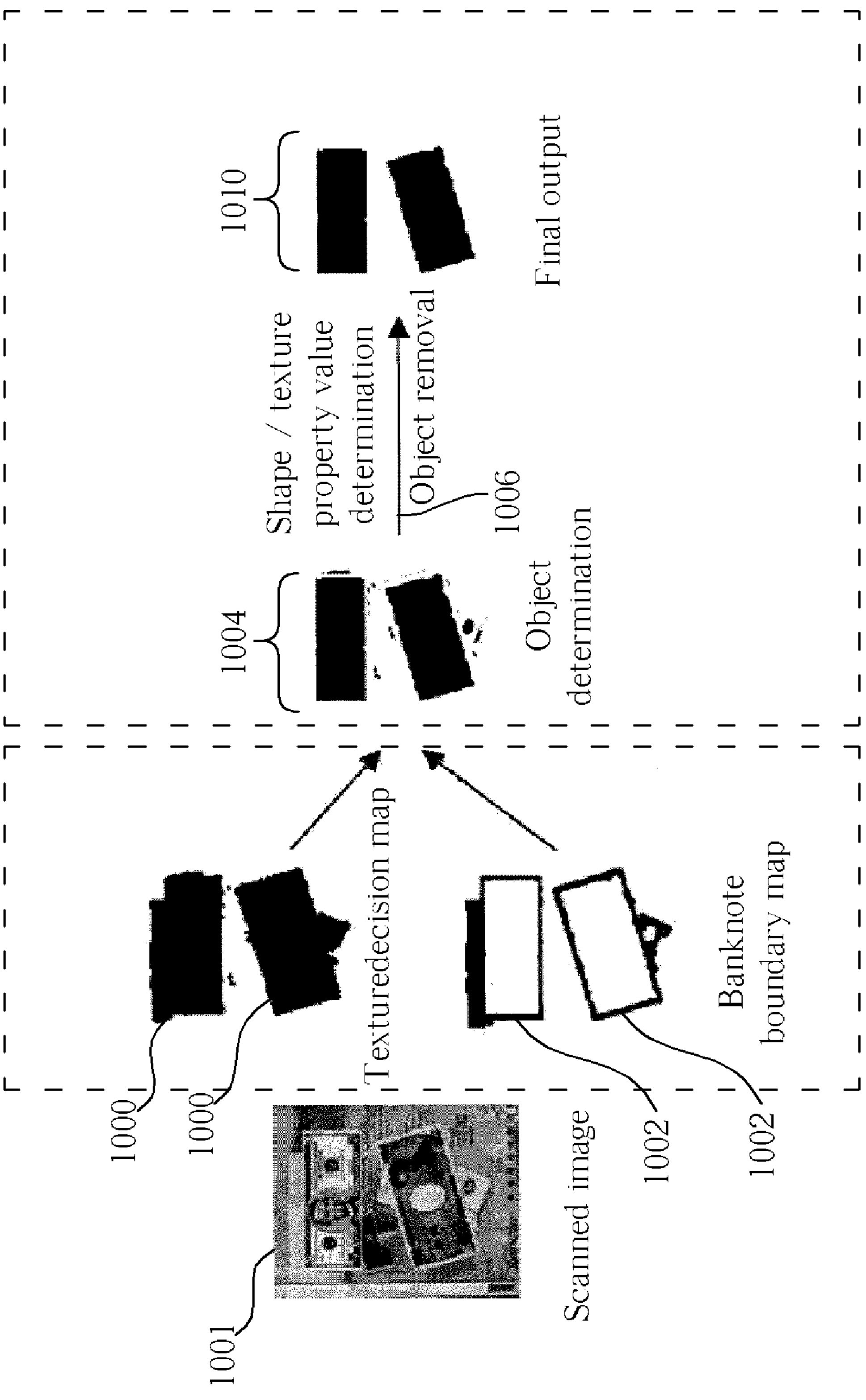
FIG. 10 illustrates a complete step-by-step for the verification method for determining areas within an image corresponding to monetary banknotes according to an embodiment of the present invention.
Figure 11:
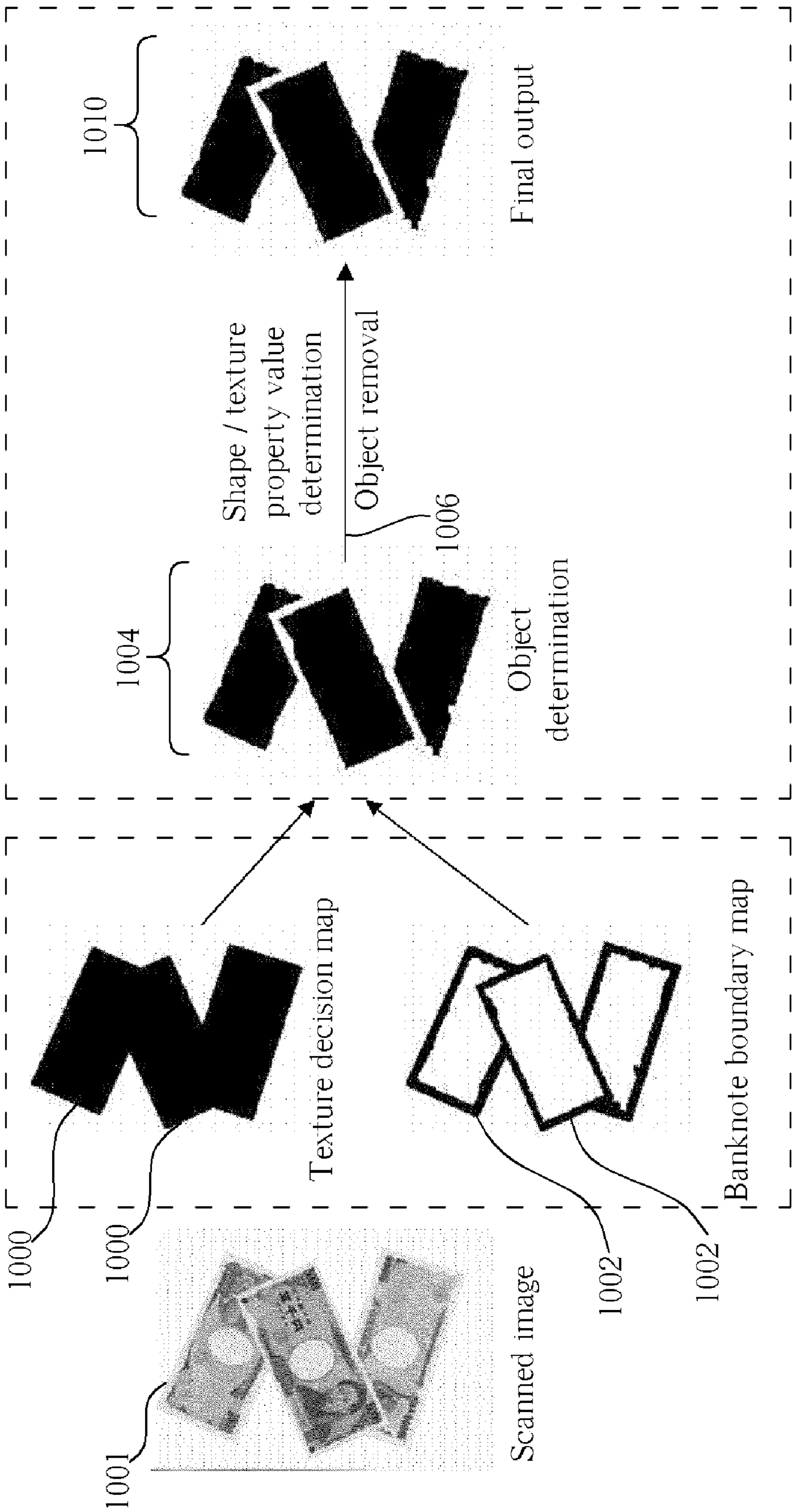
FIG. 11 illustrates an additional step-by-step for the verification method for determining areas within an image corresponding to monetary banknotes according to an embodiment of the present invention.

FIGS. 10 and 11 illustrate a complete step-by-step verification process as detailed above. In both cases, a texture decision map 1000 and banknote boundary map 1002 are derived from a scanned image 1001. Information from these two maps 1000, 1002 are combined in object determination to identify and isolate potential objects 1004 relating to banknote locations. Shape property values and texture property values are then determined for each object 1004. In object removal 1006, objects 1004 not having texture property values in a first predetermined range and the shape property values in a second predetermined range are then removed. The final output 1010 illustrates verified locations corresponding to valid monetary banknotes within the scanned image 1001.

The above detailed present invention therefore provides a verification method for determining areas within an image corresponding to monetary banknotes. Characteristics of the scanned image are compared with that of known values and/or ranges of valid monetary banknotes for verifying banknote locations within the image.

The method can be applied for use in the detection of counterfeit currency. The scanned image can contain the sample monetary banknote while superimposed onto any arbitrary background, contain multiple isolated or independent banknotes, have overlapping banknotes, or have arbitrary rotational and shift alignments.

Use of the present invention method not only provides an increased means of security measures when used in application for counterfeit banknote detection, it also provides ease of integration with common hardware devices and a viable low cost approach. Accurate detection rates, with low false detection frequencies can therefore be attained. The method is also robust and flexible enough to be applied to different image types and conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A verification method for determining areas within an image corresponding to monetary banknotes, the method comprising:

dividing the image into a plurality of image sections;

generating a banknote boundary map having border sections selected from the image sections, the border sections corresponding to a boundary of monetary banknotes within the image;

generating a texture decision map having texture sections selected from the image sections, the texture sections having a texture value within a valid range according to a valid monetary banknote;

determining a number of objects in the texture decision map by removing texture sections in the texture decision map that correspond to the border sections in the banknote boundary map;

calculating a texture property value for each object according to a texture feature map having a texture feature value for each image section;

calculating a shape property value for each object; and further removing texture sections from the texture decision map corresponding to objects that do not have the texture property value within a first predetermined range and the shape property value within a second predetermined range.

2. The method of claim 1 wherein calculating the texture property value for each object comprises generating a mean value of the texture feature values for image sections corresponding to the object.

3. The method of claim 1 wherein calculating the texture property value for each object comprises generating a variance value of the texture feature values for image sections corresponding to the object.

4. The method of claim 1 wherein calculating the texture property value for each object comprises generating a mean value and a variance value of the texture feature values for image sections corresponding to the object.

5. The method of claim 1 wherein the texture feature map is a gray level feature map having gray levels as the texture feature value for each section.

6. The method of claim 1 wherein the texture feature map is a contrast feature map having contrast values as the texture feature value for each section.

7. The method of claim 1 wherein the texture feature map is a halftone feature map having halftone values as the texture feature value for each section.

8. The method of claim 1 wherein calculating the texture property value for each object further comprises utilizing a second texture feature map having a second texture feature value for each image section.

9. The method of claim 8 wherein the second texture feature map is a gray level feature map having gray levels as the second texture feature value for each section.

10. The method of claim 8 wherein the second texture feature map is a contrast feature map having contrast values as the second texture feature value for each section.

11. The method of claim 8 wherein the second texture feature map is a halftone feature map having halftone values as the second texture feature value for each section.

12. The method of claim 1 wherein calculating the shape property value for each object comprises determining an area of the object.

13. The method of claim 12 further comprising utilizing four corners of the object to determine the area of the object.

14. The method of claim 1 wherein calculating the shape property value for each object comprises determining a distance between center points of two different diagonal lines within the object.

15. The method of claim 1 wherein calculating the shape property value for each object comprises determining lengths of two parallel lines within the object.

16. The method of claim 1 wherein calculating the shape property value for each object comprises determining an inner product using four angles within the object.

17. The method of claim 1 wherein calculating the shape property value for each object comprises determining a ratio of a width of the object and a height of the object.

18. The method of claim 1 wherein the first predetermined range corresponds to valid texture property values of valid monetary banknotes.

19. The method of claim 1 wherein the second predetermined range corresponds to valid shape property values of valid monetary banknotes.

20. The method of claim 1 wherein the valid monetary banknote is of United States of America currency.

21. The method of claim 1 wherein the valid monetary banknote is of Japan currency.

* * * * *